US005946696A

United States Patent [19]
Young

[11] Patent Number: 5,946,696
[45] Date of Patent: Aug. 31, 1999

[54] OBJECT PROPERTY LISTS

[75] Inventor: Kenneth L. Young, Redmond, Wash.

[73] Assignee: Microsoft Corporation, Redmond, Wash.

[21] Appl. No.: 08/657,021

[22] Filed: May 31, 1996

[51] Int. Cl.$^6$ .................................................. G06F 17/30
[52] U.S. Cl. ........................ 707/104; 345/333; 345/352
[58] Field of Search .................................. 345/333, 352; 395/601, 621, 326, 700, 680, 500; 342/252; 707/103, 203, 104

[56] References Cited

U.S. PATENT DOCUMENTS

| | | | |
|---|---|---|---|
| 5,210,852 | 5/1993 | Sato | 395/601 |
| 5,339,392 | 8/1994 | Risberg et al. | 345/333 |
| 5,404,439 | 4/1995 | Moran et al. | 395/326 |
| 5,454,103 | 9/1995 | Coverston et al. | 395/621 |
| 5,467,472 | 11/1995 | Williams et al. | 345/333 |
| 5,515,536 | 5/1996 | Corbett et al. | 395/700 |
| 5,530,796 | 6/1996 | Wang | 345/352 |
| 5,566,295 | 10/1996 | Cypher et al. | 395/326 |
| 5,579,521 | 11/1996 | Shearer et al. | 395/680 |
| 5,600,778 | 2/1997 | Swanson et al. | 345/333 |
| 5,613,090 | 3/1997 | Willems | 395/500 |
| 5,613,124 | 3/1997 | Atkinson et al. | 395/133 |
| 5,634,019 | 5/1997 | Koppolu et al. | 395/335 |
| 5,652,879 | 7/1997 | Harris et al. | 395/612 |
| 5,664,127 | 9/1997 | Anderson et al. | 345/333 |
| 5,680,616 | 10/1997 | Williams et al. | 707/103 |
| 5,682,510 | 10/1997 | Zimmerman et al. | 342/352 |
| 5,692,187 | 11/1997 | Goldman et al. | 707/203 |
| 5,721,919 | 2/1998 | Morel et al. | 707/203 |
| 5,729,744 | 3/1998 | Gerken | 707/203 |
| 5,787,444 | 7/1998 | Gerken et al. | 707/203 |

OTHER PUBLICATIONS

Pausch et al. "Lessons Learned from SUIT, the Simple User Interface Toolkit", v. 10, n.4, pp. 320–344, Oct. 1992.
OLE 2 Programmer's Reference, vol. 1: Working with Windows™ Objects, Microsoft Press, Redmond, Wash., 1994, Appendix B, pp. 857–859.

*Primary Examiner*—Thomas G. Black
*Assistant Examiner*—Charles L. Rones
*Attorney, Agent, or Firm*—Jones & Askew, LLP

[57] ABSTRACT

A property arithmetic system is provided that can isolate modifications made to one object and apply the modifications to another object. Such isolation and application of modifications are referred to as property arithmetic. The term "arithmetic" is used as an analogy between computations performed on properties of an object and computations performed on numbers. Using this arithmetic, a user's modifications to the properties of an object can be easily isolated by subtracting the original property values from the modified property values. Once isolated, the modifications can be applied to a different object so that the user does not have to manually recreate their modifications. In the property arithmetic system, properties of an object are stored in a property list. The property list not only contains properties, but can also contain other property lists, which provides flexibility in their use. Furthermore, the property list is stored in a contiguous block of memory. Storing the properties in this manner is advantageous when copying a property list, since the copy typically can be accomplished by a single command, whereas if the property list were stored in noncontiguous areas of memory, multiple commands would be required to copy the property list.

38 Claims, 17 Drawing Sheets

Apply

| Modified Property List 122 | border | border size | font | text size | text justification | style |
|---|---|---|---|---|---|---|
| | Dashed | 4 pt | Times New Roman | 20 pt | Centered | Italics |

−

| Unmodified Property List 120 | Solid | 4 pt | Times New Roman | 20 pt | Left Justified | Nonitalics |

=

| Differences 124 | Dashed | | | | Centered | Italics |

*FIG. 1E*

Differences 124

| border | border size | font | text size | text justification | style |
|---|---|---|---|---|---|
| Dashed |  |  |  | Centered | Italics |

Apply

Property List 126

| Solid | 8 | Arial | 20 | Left Justified | Nonitalics |
|---|---|---|---|---|---|

Result 128

| Dashed | 8 | Arial | 20 | Centered | Italics |
|---|---|---|---|---|---|

*FIG. 1F*

OBJECT PROPERTY LISTS

TECHNICAL FIELD

The present invention relates generally to data processing systems and, more particularly, to property lists of objects.

BACKGROUND OF THE INVENTION

An "object," as used in this disclosure, refers to an entity that is either displayed by a computer program or is part of a computer program and which has characteristics. An example of an object displayed by a computer program is a text box contained in a window of a computer program into which a user can input text. The characteristics of the text box include its color, the font of the text, and the point size of the text. An example of an object that is part of a computer program is an in-memory representation of an animal where its characteristics include its color, number of legs, and whether it is a carnivore. This in-memory representation could be implemented as a data structure with the elements of the data structure storing the characteristics. An example of such a data structure is the C++ class data structure. The characteristics of an object are referred to as properties of the object. Each property of an object typically has a value (e.g., the color property may have the value red).

The properties of an object can usually be modified by either a user or a computer program. For example, in a draw program that can display objects such as rectangles and triangles, a user can modify the objects' properties. These properties include the border width and shading of the objects and perhaps even the color of the objects. Using this example, a user may modify the properties of a rectangle such that a solid border becomes a dashed border and the shading becomes gray. Once these modifications are made, however, these modifications cannot be isolated and applied to another object in conventional systems. That is, if the user wants to make the same modifications (i.e., dashed border and gray shading) to either another triangle or a rectangle, the user must manually make such modifications, which is time consuming. It is thus desirable to provide functionality where the modifications made to the properties of one object can be easily isolated and applied to another object.

SUMMARY OF THE INVENTION

The system described herein stores the properties of an object in a property list. This property list has many advantages to both object developers and object users. One advantage of the property list is that it provides an implementation upon which arithmetic can be performed. The term "arithmetic" is used as an analogy between computations performed on property lists and computations performed on numbers. Using this arithmetic, a user's modifications to the properties of an object can be easily isolated by subtracting the original property values from the modified property values. Once isolated, the modifications can be applied to a different object so that the user does not have to manually recreate their modifications.

An additional advantage of the property lists is that the property lists not only contain properties, but can also contain other property lists, which provides flexibility in their use. These property lists within a property list are known as nested property lists. Furthermore, the property lists are stored in a contiguous block of memory. Storing the properties in this manner is advantageous when copying a property list, since the copy typically can be accomplished by a single command, whereas if the property list were stored in noncontiguous areas of memory, multiple commands would be required to copy the property list.

In accordance with a first aspect of the present invention, a method is provided in a computer system having a first object with first properties and a second object with second properties. The method modifies one of the first properties of the first object from an original form to a modified form where one of the second properties corresponds to the modified first property of the first object. The method also determines the modification made to the first object by comparing the original form to the modified form and applies the modification to the corresponding property of the second object.

In accordance with a second aspect of the present invention, a computer system is provided that comprises a memory and a processor. The memory has an object with a first property list containing properties within which is defined a second property list. The first property list is stored in a contiguous block of the memory. The memory also has a program for accessing the first property list of the object. The processor runs the program and facilitates the access of the first property list.

BRIEF DESCRIPTION OF THE DRAWINGS

FIGS. 1A–1F depict an example of arithmetic being performed on two objects in accordance with a preferred embodiment of the present invention.

DETAILED DESCRIPTION OF THE INVENTION

A preferred embodiment of the present invention provides a property arithmetic system that can isolate modifications made to one object and apply the modifications to another object. Such isolation and application of modifications are referred to as property arithmetic. The term "arithmetic" is used as an analogy between computations performed on properties of an object and computations performed on numbers. In particular, modifications to properties of an object are isolated by "subtracting" the properties of an object before their modification from the properties after their modification. The difference resulting from the subtraction of the properties represents the modifications made to the properties. Analogously, the modifications can be "applied" to the properties of another object so that the other object reflects the modifications.

Figure 1A:
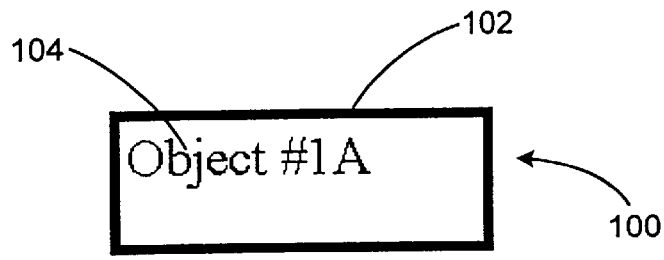
Figure 1B:
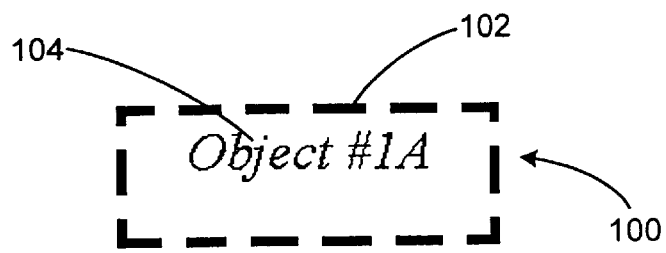

An example of property arithmetic performed by a preferred embodiment is depicted in FIGS. 1A–1D. In FIG. 1A, an object 100 is depicted, which is a text box displayed on a video display by a computer program. The object 100 comprises a border 102 and text 104 and has six properties: border style, border size, font, text size, justification, and text style. Before modification, the border style is solid, the border size is 4 point, the font is Times New Roman, the text size is 20 point, the justification is left, and the text style is non-italic. FIG. 1B depicts the object 100 after its properties have been modified by a user. The border style has been changed from solid to dashed, the justification has been changed from left to centered, and the text style has been changed from non-italic to italic. Using property arithmetic, the user can isolate the modifications to object 100 (source object) shown in FIG. 1B by subtracting the modified properties from the unmodified properties. The user can then apply the modifications to an object (destination object) of either a similar or different type. FIG. 1E depicts the subtraction of the unmodified properties of object 100 from the modified properties. As will be discussed in greater detail below, properties and their values are represented by a property list. The property list 120 reflects the properties of object 100 before modification and the modified property list 122 reflects the properties of object 100 after modification. The modified property list 122 is shown aligned with the unmodified property list 120. The differences between the modified property list and the unmodified property list is the difference property list 124. In the difference property list 124, each property that was not modified is not represented, whereas each property that was modified contains the new value.

Figure 1C:
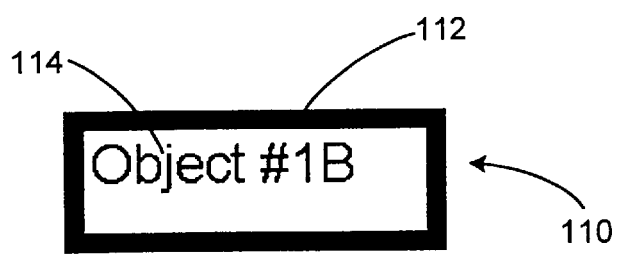
Figure 1D:
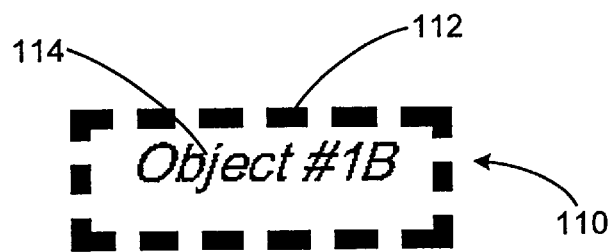

FIG. 1C depicts an object 110 that has the same properties as object 100, but with different values. In particular, object 110 has a border style of solid, a border size of 8 point, a font of Arial, a text size of 20, a justification of left, and a text style of non-italic. The result of the isolation of the user's modifications to object 100 and the application of these modifications to object 110 is depicted in FIG. 1D. Since the border 102 of object 100 was changed to dashed, the border 112 of object 110 in FIG. 1D is also changed to dashed. Note, however, that since the user did not change the width of border 102 of object 100, the width of border 112 of object 110 remains unchanged from its original setting (i.e., 8 point). Also, since the user both italicized and centered the text 104, the text 114 of object 110 is also italicized and centered even though the text is both different and in a different font. FIG. 1F depicts the applying of the difference property list 124 to the unmodified properties 126 of object 110 with the result of the applying contained in the result property list 128. When applying property lists, each property that is not represented in the difference property list 124 results in the corresponding property of the result property list 128 having the corresponding value of the unmodified property list 126. Conversely, each property that is represented in the difference property list 124 results in the corresponding property of the result property list 128 having the corresponding value of the difference property list 124.

In addition to being able to subtract and apply property lists, the present invention can add property lists. The adding of two property lists results in a combination of the property lists that is the union of each property in the lists. That is, the combination property list contains each property and its value that is in only one of the property lists and contains each property that is in both of the property lists with a value selected from one of the property lists.

In a preferred embodiment, the property arithmetic system provides a function to subtract property lists and a function to add property lists. These functions can be shared by various application programs that wish to perform property arithmetic. To allow such sharing, the property arithmetic system specifies a standard property list format for these functions. Since each object may use internally an incompatible, nonstandard property list format, it is the responsibility of the application program responsible for managing the object to provide a function to generate a property list in the standard format from its incompatible format. Conversely, the application program that manages an object also provides a function that applies a property list in the standard format to its incompatible property list.

In a preferred embodiment, the properties of an object are stored in a property list that not only contains properties but also may contain other property lists. These property lists within a property list are known as nested property lists. The nested property lists provide flexibility in their use so that complex collections of properties can be stored. Furthermore, the property lists are preferably stored in a contiguous block of memory. Storing the properties in this manner is advantageous when copying a property list, since the copy typically can be accomplished with a single memory copy command, whereas if the property list were stored in noncontiguous areas of memory, multiple memory copy commands would be required to copy the property list.

Implementation Details

An embodiment of the present invention is used as part of a document publishing system known as the Microsoft Publisher, which is available from Microsoft™ Corporation of Redmond, Wash. This system allows a user to edit documents and insert various objects containing graphics data, video data, text data, spreadsheet data or other kinds of data. In addition, the system allows the user to modify the properties of the objects. This system has a number of predefined object types that have predefined properties which are set to standard values (described below). Each object type has a different set of properties and/or property values. Each object is an instance of their object type. As such, the settings of an object in its original form are readily obtainable. Although an embodiment is described with reference to a document publishing system, one skilled in the art will recognize that the techniques described herein can be applied to a virtually unlimited number of other types of systems.

Figure 2:
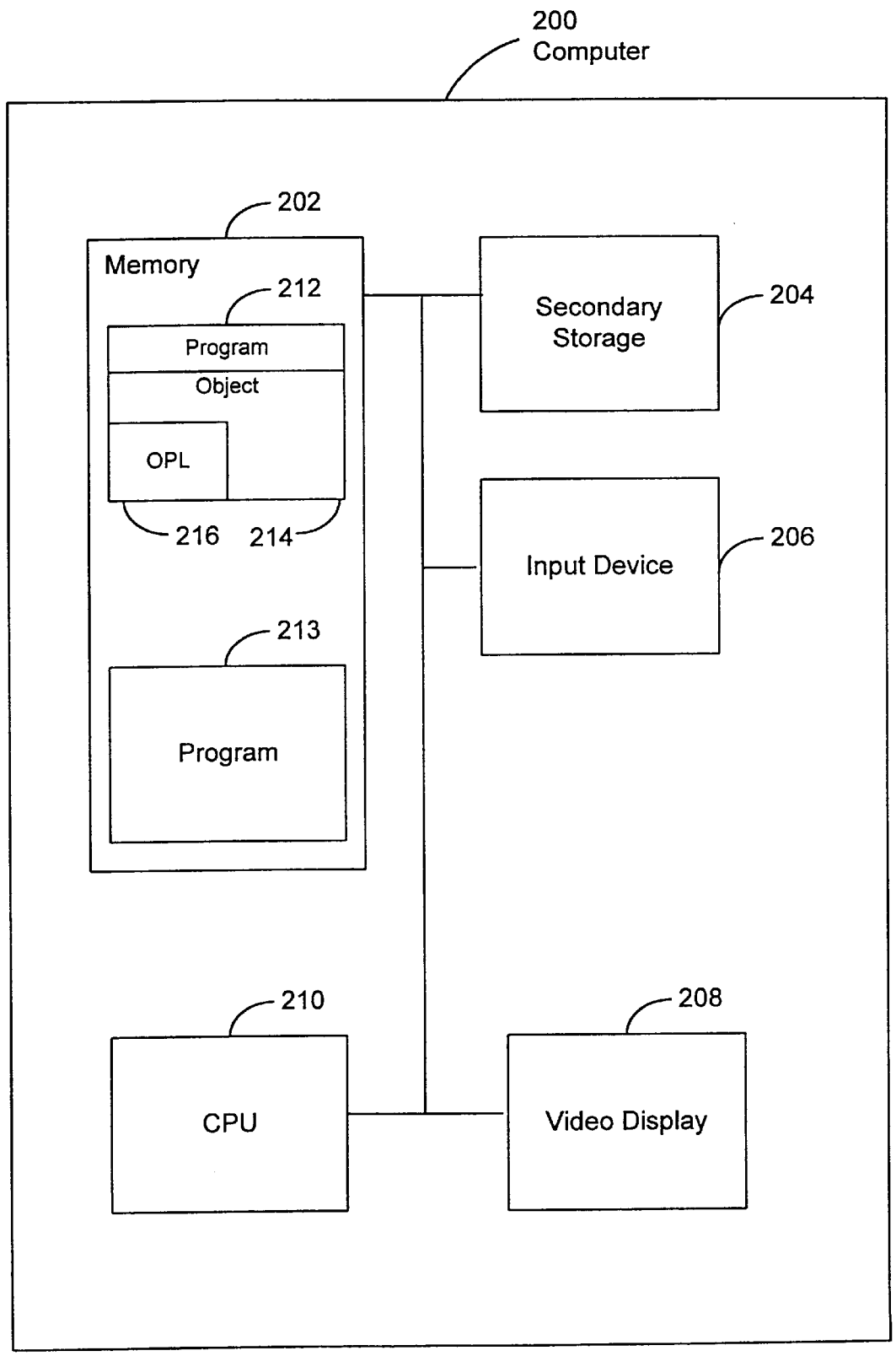
FIG. 2 depicts an object property list of a preferred embodiment within a computer suitable for practicing a preferred embodiment of the present invention.

FIG. 2 depicts a computer 200 that is suitable for practicing a preferred embodiment of the present invention. The computer 200 contains a memory 202, a secondary storage device 204, an input device 206, a video display 208, and a central processing unit (CPU) 210. The memory 202 contains program 212 and program 213. The program 212 manages object 214 which in turn contains an object property list (OPL) 216 of the preferred embodiment. The OPL 216 is stored in a contiguous block of the memory 202. The program 213 accesses the OPL 216 of the object 214 and performs various functionality using the OPL as will be described below.

Since the OPL 216 uses a standard format, the OPL can be used to store internally the properties of an object and can be used as a parameter to a function that will perform an operation on the properties of an object. For example, when program 213 wishes to perform an operation, such as the apply operation, on the properties of object 214, an OPL that identifies properties to be modified is supplied to the program. The apply operation, which is discussed in greater detail below, receives that OPL and modifies the properties of the object 214, which may be in a nonstandard format, so as to reflect the property values contained in the received OPL.

An OPL can be specified in two modes: standard mode or no-input-no-change (Ninch) mode. In order to fully understand the distinction between a standard mode OPL and a Ninch mode OPL, each must be described from the perspective of how they are generated and how they are used in an operation such as the apply operation. When generating a standard mode OPL for an object, the properties of the object are stored in the OPL with the exception that each property containing a standard value is omitted. That is, each property can contain numerous values. One of these values is predetermined to be a "standard" value and also acts as the property's default value. For example, the standard value for the border size property may be 4 point. The property arithmetic system preferably maintains a system-wide table of mappings between standard values and properties. When a standard mode OPL is used as a parameter to an apply operation, the omission of a property in the OPL (e.g., border size) indicates that the object's corresponding property (e.g., border size) should be set to its standard value (e.g., 4 point).

When generating a Ninch mode OPL, all properties are stored regardless of whether the property is set to its standard value. When such an OPL is used to identify the properties to be modified in an apply operation, an omission of a property in that OPL indicates that the current value of the corresponding property on the object to which that OPL is to be applied should remain unchanged; hence the name no-input-no-change. For example, if the OPL in the apply operation did not contain a border size property and the value for the border size property of the object were 8 point, after the apply operation is performed, the value of the object's border size property would remain set to 8 point.

Both standard mode OPLs and Ninch mode OPLs have their advantages. Standard mode OPLs can save memory over Ninch mode OPLs by containing only properties that have nonstandard values. The functionality of the Ninch mode OPL is advantageous under certain circumstances, such as when an OPL of a source object is applied to a destination object of a different type. For instance, when a Ninch mode OPL is applied to a destination object of a different type, properties on the destination object for which there is no corresponding property on the Ninch mode OPL are unaffected. However, if a standard mode OPL were used, all properties of the destination object not specified in the OPL would be set to their standard value. In this situation, the unspecified properties would be unintentionally modified, which may have undesirable effects.

Figure 3:
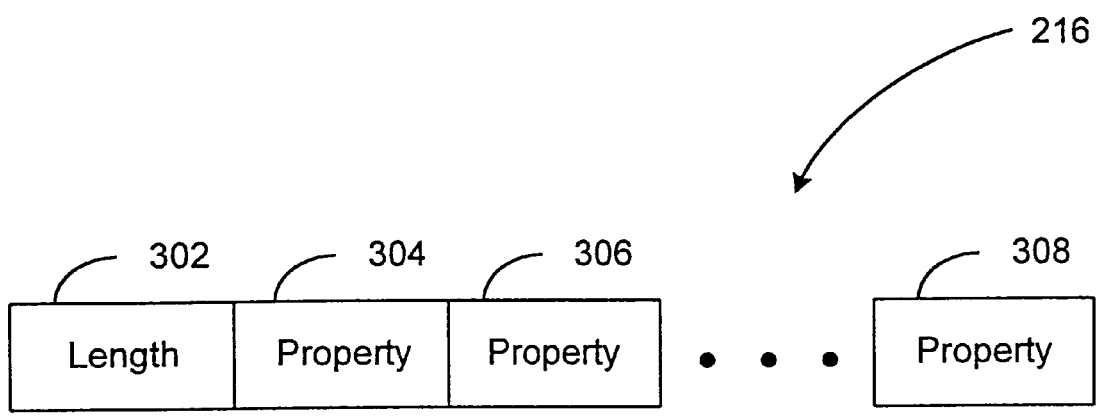
FIG. 3 depicts the object property list of FIG. 2 in more detail.

FIG. 3 depicts the OPL 216 in more detail. The OPL 216 contains a length field 302, which contains the entire length in bytes of the entire OPL, followed by a number of properties 304, 306, and 308. Each property 304, 306, and 308 is implemented as an opy data structure as depicted below in Code Table 1. The term "opy" is a mnemonic for object property.

Code Table 1

```
// Object Property Types
#define optSpecial     0 // Special value: 0 bytes follow, data in opsc
#define optShort       1 // Data is 2 bytes
#define optLong        2 // Data is 4 bytes
#define optComplex     3 // lcb follows; then lcb bytes of data
#define optOp1         4 // Same as optComplex, but data is a
                        // nested property list
// Object Property Special Codes: valid when optSpecial
#define opscFalse      0 // fFalse
#define opscTrue       1 // fTrue
#define opscStandard   2 // Standard (default) property value;
                        // we don't know what it is
#define opscNinch      3 // Indeterminate value
#define opscPrev       4 // Same as last value
// Object Property
typedef struct opy
{
   WORD opyid;          // Object Property ID
   WORD opf: 8;         // Object Property Format: 8 bits
   WORD unused: 2;      // Room for growth: 2 bits
   WORD opsc: 3;        // Object Property Special Code: used if
                        // optSpecial
   WORD opt: 3;         // Object Property Type: 3 bits
   // Data follows in non-optSpecial cases
   union
   {
   WORD wData;          // used if optShort
   LONG 1Data;          // used if optLong
   struct
      {
      LONG lcb;         // Size of the data: used if optComplex or
                        // optOp1
      BYTE rgb[0];      // The data itself
      };
   OPL opl;             // a sub-OPL: used if optOp1. Note that lcb's
   line up.
   };
} OPY;
```

The "opyid" element contains a numerical identifier that is associated with the property and which is known as the property id. The system maintains a mapping of all properties to their property ids and this mapping is valid system wide. In other words, a given property id refers to the same property regardless of the location of the object in the system. The properties 304, 306, and 308 in the OPL 316 are ordered sequentially by the opyid. The "opf" element indicates the format of the property and provides information regarding how to interpret the data of the property. For example, the format may indicate that the data is an unsigned integer, a signed integer, a Boolean, a text string, a color, or some other format that has meaning to the object. The "opt" element contains the property type. The property type is an indication of whether the property is an optSpecial, optShort, optLong, optComplex, or an optOpl type of property. The "optSpecial" property type indicates that the data for the property is contained in the opsc element. The optShort property type indicates the data is 2 bytes in length and the optLong property type indicates that the data is 4 bytes in length. The "optComplex" property type indicates that the data has a variable length, such as a character string. The first 4 bytes of the data indicate its length. The "optOpl" property type indicates that the data is a nested property list, the first 4 bytes of which contain its length.

The "opsc" element indicates a special use of the property when the opt element is set to optSpecial. The valid settings for the opsc element include opscFalse, opscTrue, opscStandard, opscNinch, and opscPrev. The "opscFalse"

and "opscTrue" values are used when the property has a Boolean value. The "opscstandard" value is used when the property is utilizing its standard value within a Ninch mode OPL. The "opscNinch" code indicates that when the OPL is used as a descriptor, there is no change to this property. The "opscPrev" code indicates that the value for this property is the same as the previous property's value in the OPL. Following the opyid, opf, unused, opsc, and opt elements, which are collectively referred to as the header portion of the opy structure, is the data portion of the opy structure. The data portion of the opy structure is a union of the various different types of data that can be stored within the structure.

Figure 4:
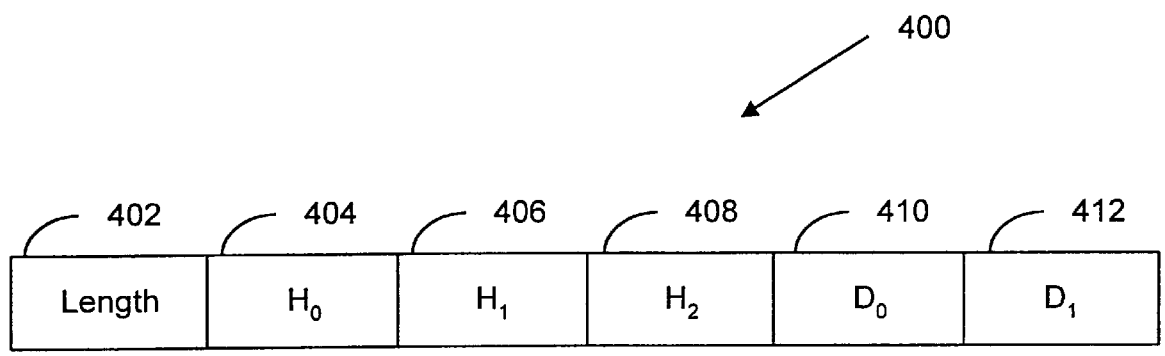
FIG. 4 depicts an alternative object property list of the present invention.

An alternative embodiment of the OPL of the present invention is depicted in FIG. 4. The alternative OPL 400, like OPL 216, is stored in a contiguous block of memory. The alternative OPL 400 contains a length field 402 and a number of header fields 404, 406, 408 followed by a number of data fields 410 and 412. In the alternative OPL 400, the header portion of the opy structure for each of the properties is contained in a header field, and the data portion of the opy structure is stored in a data field if the property has either complex data or the data is a nested OPL. That is, the header fields 404, 406, 408 contain the opyid, opf, unused, opsc, and opt elements of the opy data structure described above. In addition, if the type of data for the property is either optSpecial, optShort or optLong, the data is also provided in the header portion. However, if the data portion is optComplex or optOpl, the header portion does not contain the data, but instead contains a 4-byte pointer to where the data is specified, such as a pointer to $D_0$ 410. The data fields 410, 412 contain either complex data or a nested OPL. By utilizing the alternative OPL, memory savings can be realized. Typically, an object may have more than one complex property or nested OPL that is used by more than one property. By using the alternative OPL, similar data does not have to be duplicated, only the header portion is duplicated. For example, if an object has two properties with each containing the same character string, a header portion for each property is stored in a header field with a pointer to the location of the data (i.e., character string) and only one copy of the data is stored in a data field. Since the character string does not have to be duplicated, memory savings are realized.

Figure 5A:
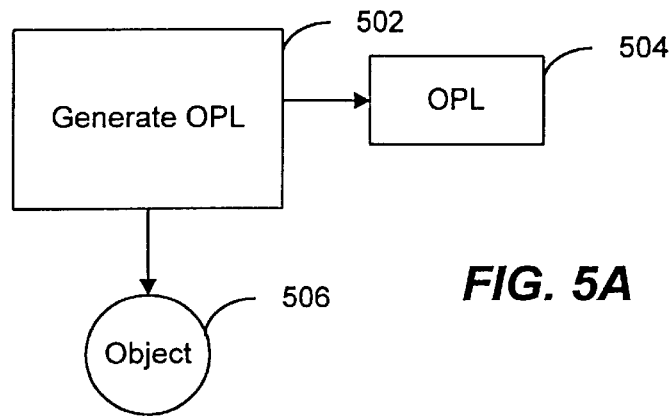
FIG. 5A depicts a functional diagram of the generate OPL function.

There are four functions that assist a program in using OPLs. These functions include a generate OPL function, a subtract OPLs function, an add OPLs function, and an apply OPL function. The generate OPL function is implemented by the program (e.g., program 212) that manages the object (e.g., object 214). As can be seen from FIG. 5A, the generate OPL function 502 generates an OPL 504 that is used as a descriptor for the properties contained in the property list of an object 506.

Figure 5B:
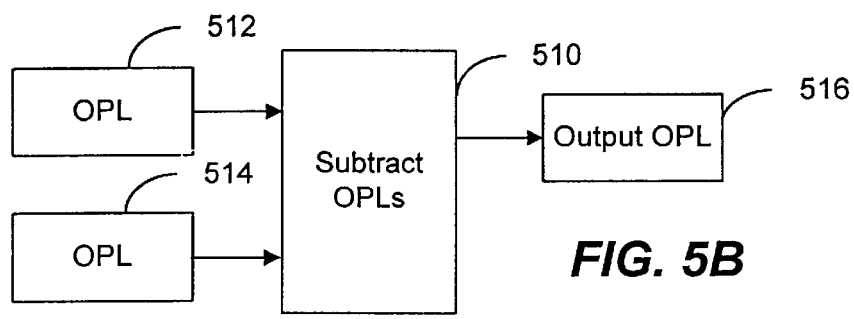
FIG. 5B depicts a functional diagram of the subtract OPLs function.

The subtract OPLs finction is system-provided as part of a module that is linked with a computer program that wishes to access an OPL. As shown in FIG. 5B, the subtract OPLs function 510 receives two OPLs 512, 514 as input and returns an OPL 516 as output that contains the difference between the two input OPLs.

Figure 5C:
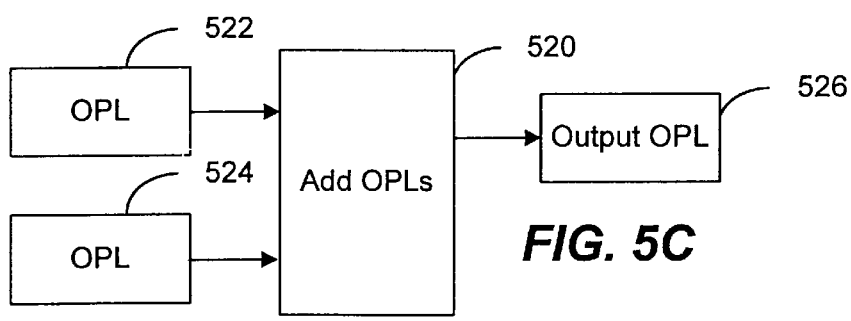
FIG. 5C depicts a functional diagram of the add OPLs function.

The add OPLs function is also system-provided as part of a module to be linked. As depicted in FIG. 5C, the add OPLs function 520 receives two OPLs 522, 524 as input and returns an output OPL 526 containing the combination of the properties contained in two input OPLs. That is, the properties of the two input OPLs 522, 524 are added together to form a superset of the properties contained in both.

Figure 5D:
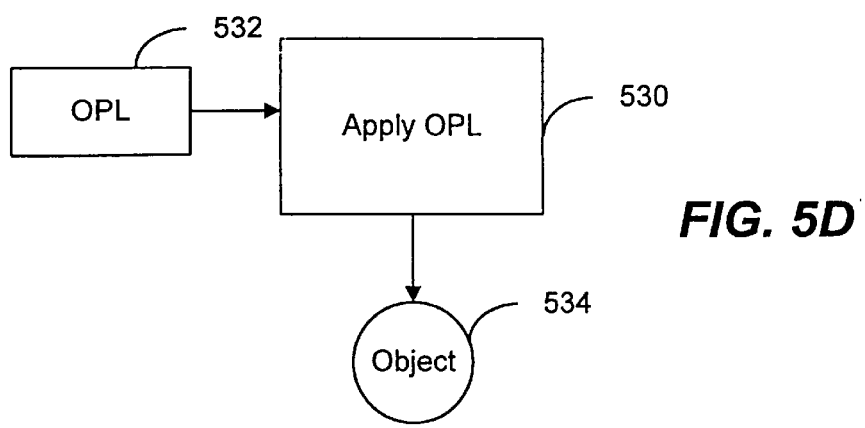
FIG. 5D depicts a functional diagram of the apply OPL function.

The apply OPL function is implemented by the program that manages an object. As shown in FIG. 5D, the apply OPL function 530 receives an OPL 532 as input containing requested properties and modifies the properties of object 534 so as to reflect the property values specified in the OPL 532.

Figure 6:
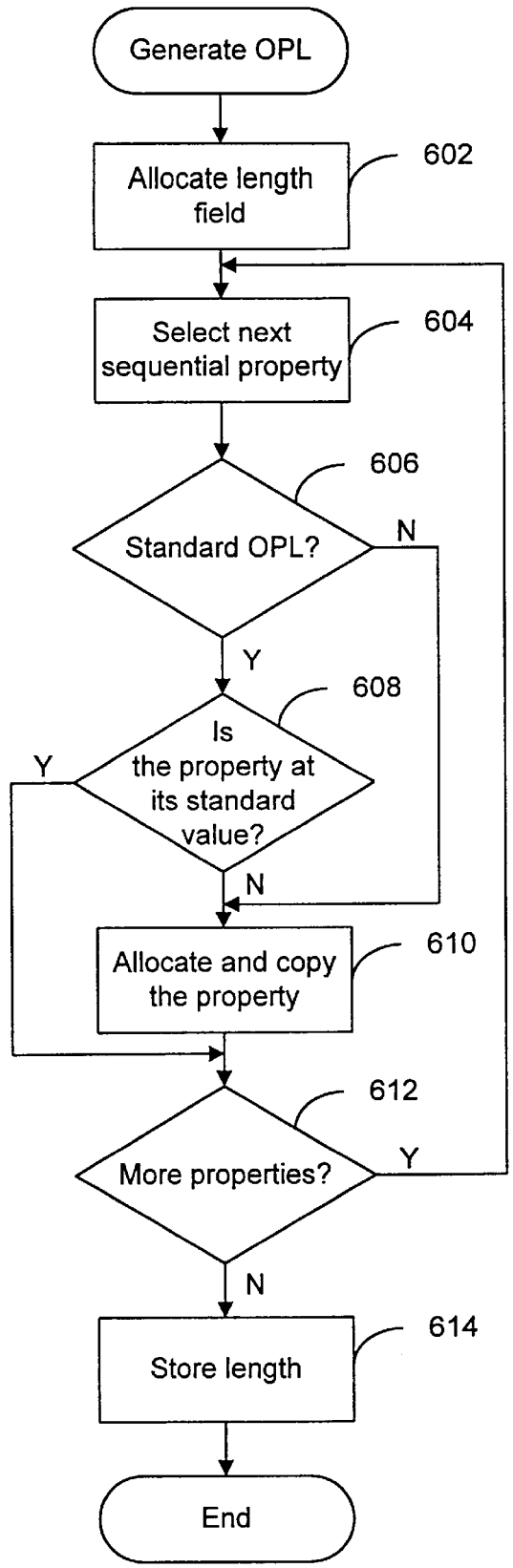
FIG. 6 depicts a flow chart of the steps performed by the generate OPL function.

A flowchart of the steps performed by the generate OPL function is depicted in FIG. 6. As stated above, the generate OPL function accesses an object and returns an OPL that describes the properties in the property list of that object in either standard mode or Ninch mode. The first step performed by the generate OPL function is to allocate the length field (step 602). The memory needed for the length field is allocated in this step, but the length is not stored until later. After allocating the length field, the generate OPL function selects the next sequential property as stored in the object's property list, starting with the first (step 604). Each property stored in the object's property list is stored in a sequence ordered by the property id. Next, the generate OPL function determines whether a standard OPL has been requested (step 606). A parameter of the generate OPL function designates whether a standard mode OPL or a Ninch mode OPL should be returned. If a Ninch mode OPL has been requested, processing continues to step 610. If a standard mode OPL is requested, the generate OPL function determines if the property is set to its standard value (step 608). In this step, the generate OPL function compares the value of the property against the mapping of standard values to properties to make this determination. If the property is set to its standard value, processing continues to step 612. However, if the property is not set to its standard value, the generate OPL function allocates sufficient memory for the property structure and copies the property structure into this allocated memory (step 610). Next, the generate OPL function determines if there are more properties (step 612). If there are more properties, processing continues to step 604. Otherwise, the generate OPL function stores the length of the OPL into the length field (step 614) and processing ends.

Figure 7A:
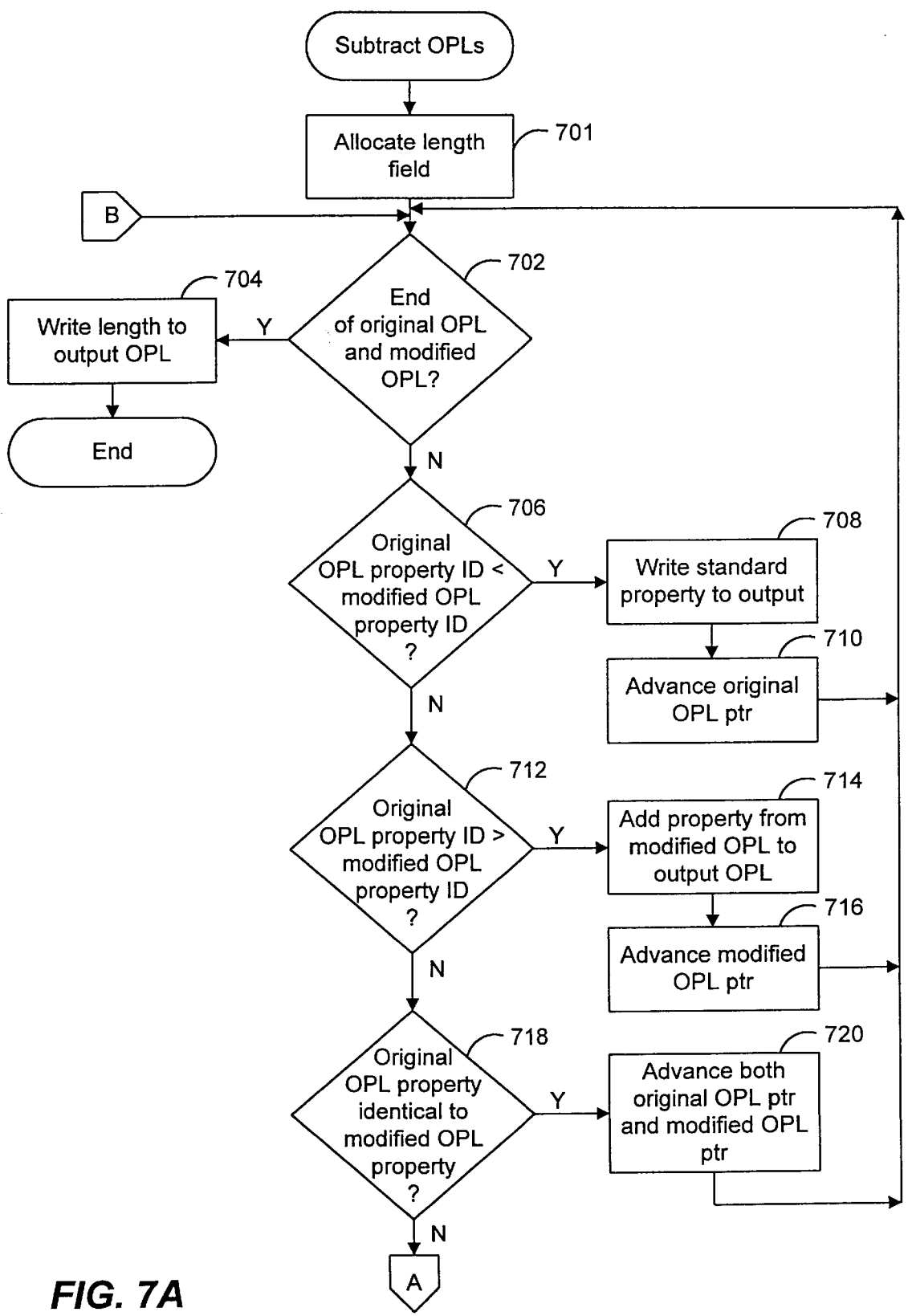
FIGS. 7A and 7B depict a flow chart of the steps performed by the subtract OPLs function.
Figure 7B:
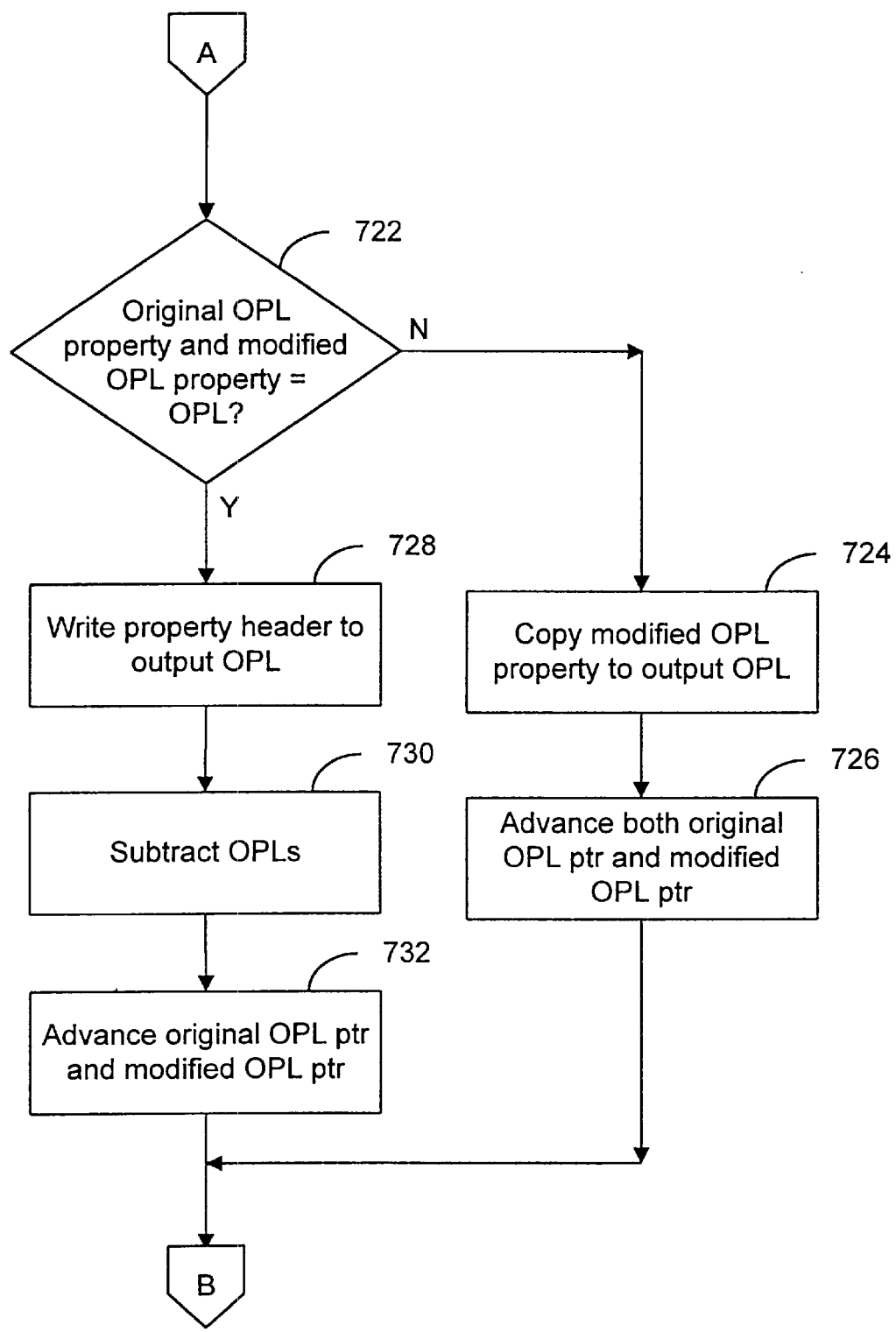

FIGS. 7A and 7B depict a flowchart of the steps performed by the subtract OPLs function. The subtract OPLs function receives an OPL describing the properties of an object in its original form (original OPL) and an OPL describing the object in a modified form (modified OPL). The subtract OPLs function compares the two OPLs and determines the differences between the two, returning the differences (or modifications) in an output OPL. As part of the processing of the subtract OPLs function, the subtract OPLs function maintains a pointer into both the original OPL and the modified OPL. It should be noted that the processing described below is described relative to the original OPL and the modified OPL being standard mode OPLs and the output OPL being a Ninch mode OPL. However, if both the original OPL and the modified OPL were Ninch mode OPLs, one skilled in the art would appreciate that the processing would be similar.

The first step performed by the subtract OPLs function is to allocate the memory for the length field in the output OPL (step 701). Next, the subtract OPLs function determines whether the end of the original OPL or the modified OPL has been reached by their respective pointer (step 702). If the end of both the original OPL and the modified OPL has been reached, the subtract OPLs function writes the length into the output OPL (step 704) and processing ends. However, if the end of the original OPL or the modified OPL has not been reached, the subtract OPLs function determines if the currently referred to original OPL property id is less than the currently referred to modified OPL property id (step 706). Since the property ids within an OPL are stored sequentially, when comparing the property ids referred to by the original OPL pointer and the modified OPL pointer, if the original OPL property id is less than the modified OPL property id, a property that is contained in the original OPL is not contained in the modified OPL. That is, this property has been reset to its standard value and as such, the subtract OPLs function writes the standard value for the property to the output OPL (step 708), advances the original OPL pointer to refer to the next property (step 710) and continues to step 702.

If the original OPL property id is not less than the modified OPL property id, the subtract OPLs function determines if the original OPL property id is greater than the modified OPL property id (step 712). If this condition is true, the modified OPL contains a property having a nonstandard value where the original OPL had this property set to its standard value. As such, the subtract OPLs function adds the property from the modified OPL to the output OPL (step 714), advances the modified OPL pointer to refer to the next property (step 716), and continues to step 702. If the original OPL property id is not greater than the modified OPL property id (i.e., the property ids are equal), the subtract OPLs function determines if the original OPL property is identical to the modified OPL property (step 718). If the original OPL property is identical to the modified OPL property, no modification has been made to this property and so this property can be skipped. Hence, the subtract OPLs function advances both the original OPL pointer and the modified OPL pointer to refer to the next property (step 720) and continues to step 702.

If the original OPL property is not identical to the modified OPL property, the subtract OPLs function determines if the original OPL property and the modified OPL property are nested OPLs (step 722 in FIG. 7B). If either the original OPL property or the modified OPL property is not a nested OPL, the generate OPLs function copies the modified OPL property to the output OPL (step 724), advances both the original OPL pointer and the modified OPL pointer (step 726), and continues to step 702. However, if the original OPL property and the modified OPL property are nested OPLs, the subtract OPLs function writes the property header to the output OPL (step 728), recursively invokes the subtract OPLs function passing the original OPL property and the modified OPL property as parameters (step 730), and advances both the original OPL pointer and modified OPL pointer (step 732). After advancing the pointers, processing continues to step 702 to process another property.

Figure 8A:
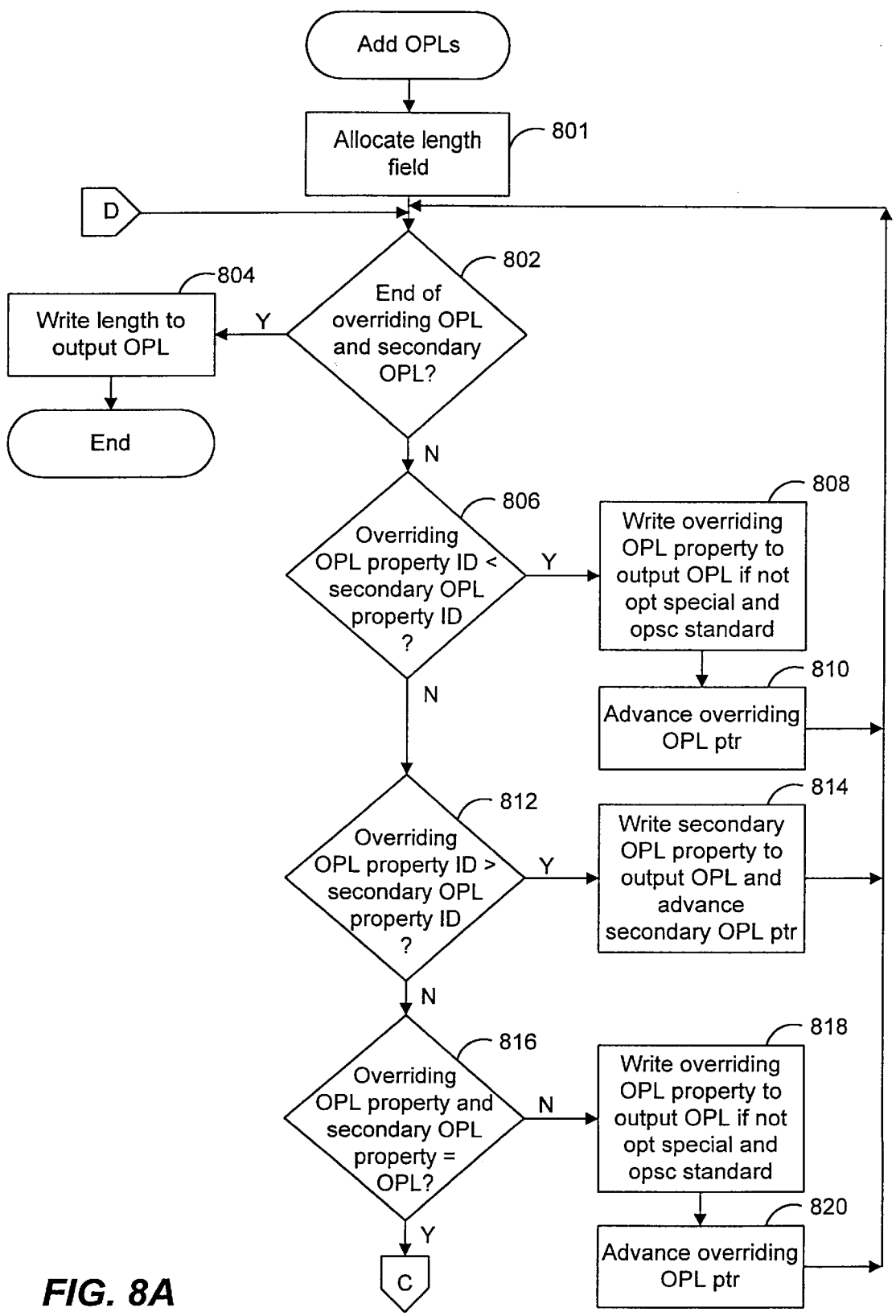
FIGS. 8A and 8B depict a flow chart of the steps performed by the add OPLs function.
Figure 8B:
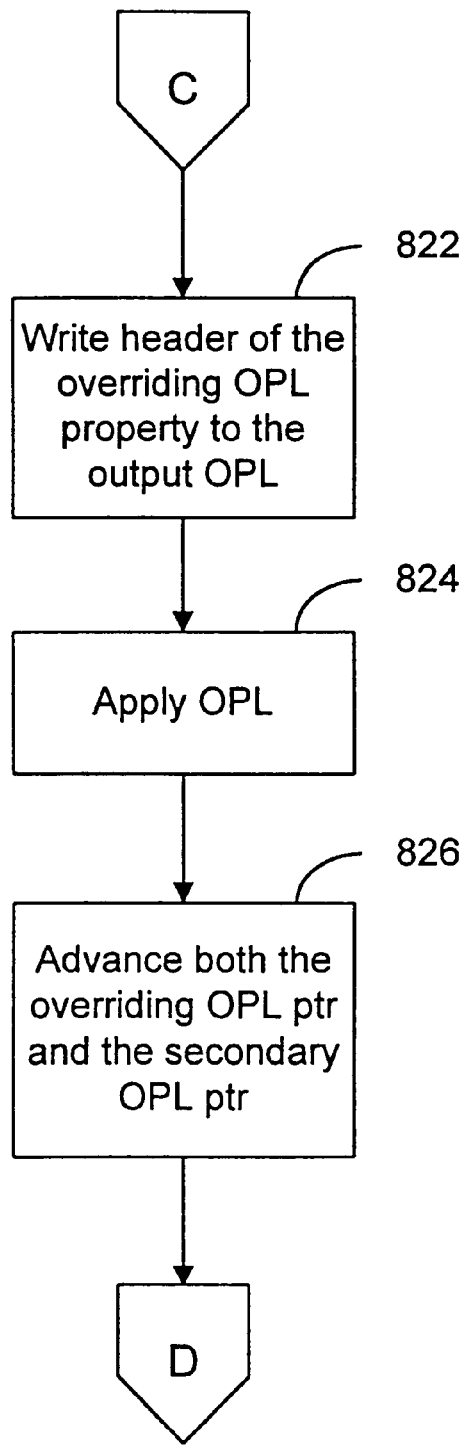

FIGS. 8A and 8B depict a flowchart of the steps performed by the add OPLs function. The add OPLs function receives two OPLs as input and returns an output OPL that contains a superset of both the input OPLs. One of the input OPLs is designated as an overriding OPL and the other input OPL is designated as a secondary OPL. When a conflict occurs (i.e., when the same property is contained in both OPLs), the property value from the overriding OPL supersedes the value of the corresponding property in the secondary OPL and is copied to the output OPL. The overriding OPL is a Ninch mode OPL, the secondary OPL is a standard mode OPL, and the output OPL is a standard mode OPL. One skilled in the art will appreciate that both the overriding OPL and the secondary OPL could be Ninch mode OPLs. The add OPLs function, as part of its processing, maintains a pointer into both the overriding OPL and the secondary OPL. The first step performed by the add OPLs function is to allocate sufficient memory for the length field in the output OPL (step 801). Next, the add OPLs function determines whether the end of the secondary OPL and the overriding OPL has been reached (step 802). If the end of the secondary OPL and the overriding OPL has been reached, the add OPLs function writes the length to the output OPL (step 804) and processing ends. However, if the end of either the secondary OPL or the overriding OPL has not been reached, the add OPLs function determines if the overriding OPL property id is less than the secondary OPL property id (step 806). Since the overriding OPL is a Ninch mode OPL, the secondary OPL is a standard mode OPL, and the output OPL is a standard mode OPL, if the overriding OPL property id is less than the secondary OPL property id, a value for this property is being changed from the value in the secondary OPL. In this case, the add OPLs function writes the overriding OPL property to the output OPL only if the overriding OPL property is not set to its standard value (step 808). The value is written only when it has a nonstandard value since the output OPL is a standard mode OPL. After writing the overriding OPL property to the output OPL, the add OPLs function advances the overriding OPL pointer (step 810) and continues to step 802.

If the overriding OPL property id is not less than the secondary OPL property id, the add OPLs function determines if the overriding OPL property id is greater than the secondary OPL property id (step 812). If the overriding OPL property id is greater than the secondary OPL property id, the property in the secondary OPL is not modified and as such, the add OPLs function writes the secondary OPL property to the output OPL, advances the secondary OPL pointer (step 814) and continues to step 802. In this step, since the overriding OPL is a Ninch mode OPL, a missing property indicates that the current property value should be used. If the overriding OPL property id is not greater than the secondary OPL property id, the overriding property id is equivalent to the secondary property id, and the add OPLs function determines if both the overriding OPL property and the secondary OPL property are nested OPLs (step 816). If either the overriding OPL property or the secondary OPL property is not a nested OPL, the add OPLs function writes the overriding OPL property to the output OPL if it is not set to its standard value (step 818). In this step, the add OPLs function is resolving a conflict in favor of the overriding property. That is, when two properties are encountered having the same property id, the overriding property supersedes the secondary property. The add OPLs function then advances the overriding OPL pointer (step 820) and processing continues to step 802. However, if both the overriding OPL property or the secondary OPL property are nested OPLs, the add OPLs function writes the header portion of the overriding OPL property to the output OPL (step 822 in FIG. 8B), recursively invokes the add OPLs function (step 824), and advances both the overriding OPL pointer and the secondary OPL pointer (step 826). Processing then continues to step 802.

Figure 9:
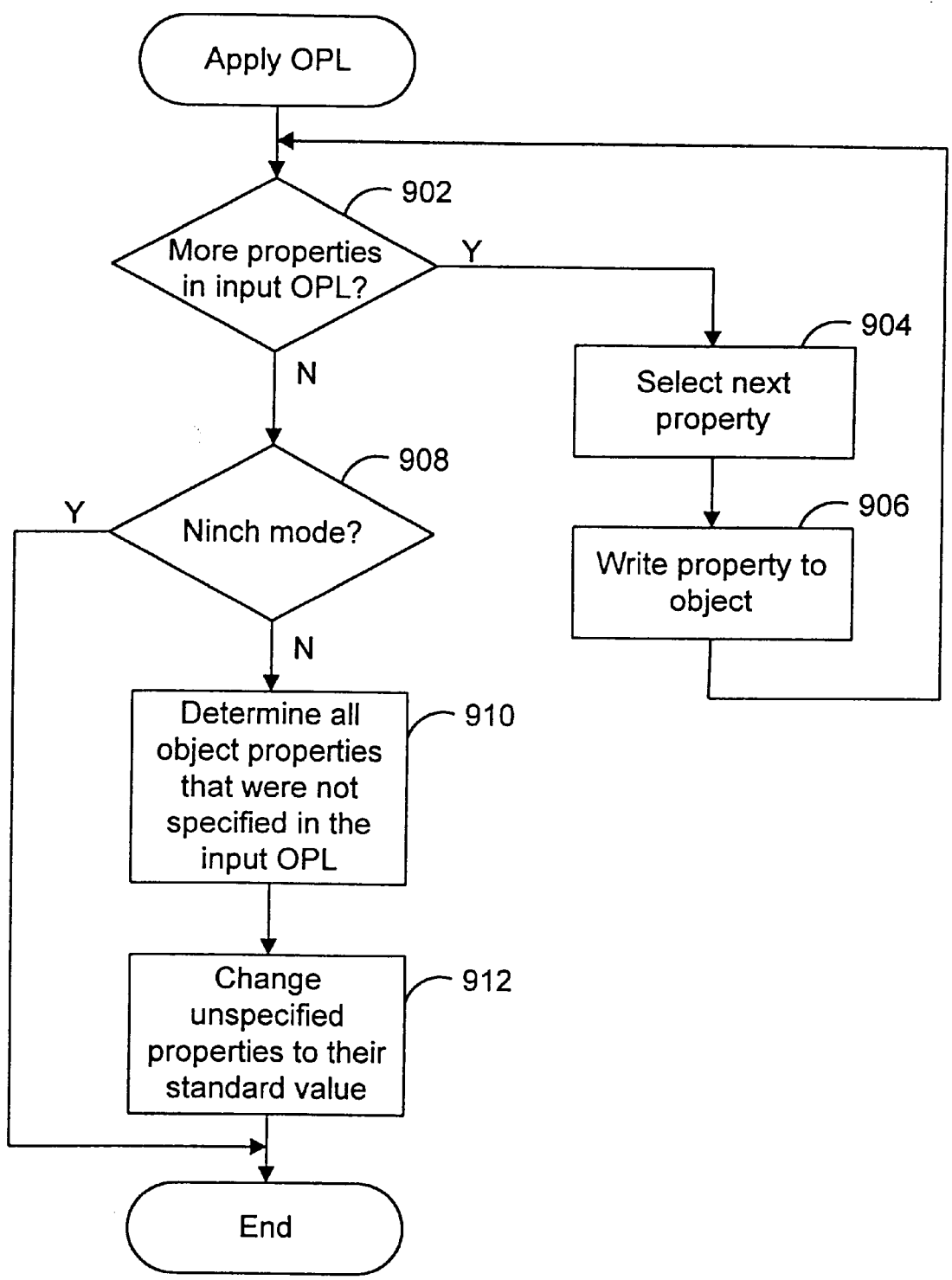
FIG. 9 depicts a flow chart of the steps performed by the apply OPL function.

FIG. 9 depicts a flowchart of the steps performed by the apply OPL function. The apply OPL function receives an OPL as input and applies the property values contained in the input OPL to the properties of an object. The first step performed by the apply OPL function is to determine if there are more properties in the input OPL (step 902). If there are more properties in the input OPL, the apply OPL function selects the next property, starting with the first (step 904) and writes the property with its value to the object (step 906). Processing then continues to step 902. If there are no more properties in the input OPL, the apply OPL function determines if it has been invoked in either Ninch mode or standard mode. This determination is made by examining a parameter. If the apply OPL function has been invoked in Ninch mode, processing ends since any unspecified properties within the input OPL indicates that the values of the object's properties should remain unchanged. If the apply OPL function has been invoked in standard mode, the apply OPL function determines all of the object's properties that were not specified in the input OPL (step 910). Next, the apply OPL function changes these unspecified properties to their standard value (step 912). In this step, the apply OPL function accesses the mapping of properties to their standard values and sets the unspecified properties of the object to their standard value.

Applications

Figure 10:
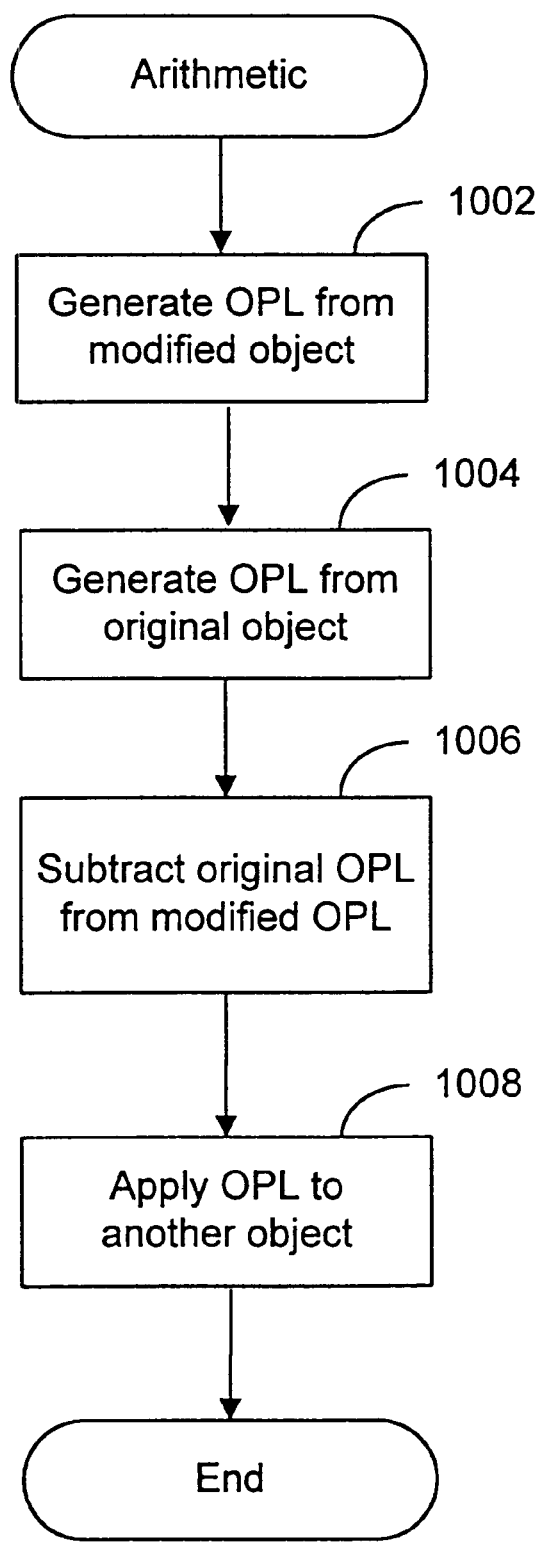
FIG. 10 depicts a flow chart of the steps performed by the arithmetic application.

Following is a description of four applications that take advantage of the benefits of the OPL of the preferred embodiment and which use the previously described functions. The first application is the arithmetic application which has been previously described with reference to FIGS. 1A–1F. In the arithmetic application, a user has modified an original object and the modifications are then isolated and applied to another object. FIG. 10 depicts a flowchart of the steps performed by the arithmetic application. The first step performed by the arithmetic application is to invoke the generate OPL function on the modified object (step 1002). This step will return an OPL describing the properties of the modified object. The generate OPL function is then invoked on the original object (step 1004). This step will return an OPL describing the properties of the original object. Next, the subtract OPL function is invoked with the OPLs returned from both step 1002 and 1004 being passed as parameters (step 1006). In this step, the subtract OPL function will isolate the modifications and will return an OPL containing the modifications. After isolating these modifications, the apply OPL function is invoked on a given object with the OPL returned in step 1006 as a parameter (step 1008). After the processing of this step, the object to which the modifications have been applied will have its properties modified accordingly.

Figure 11:
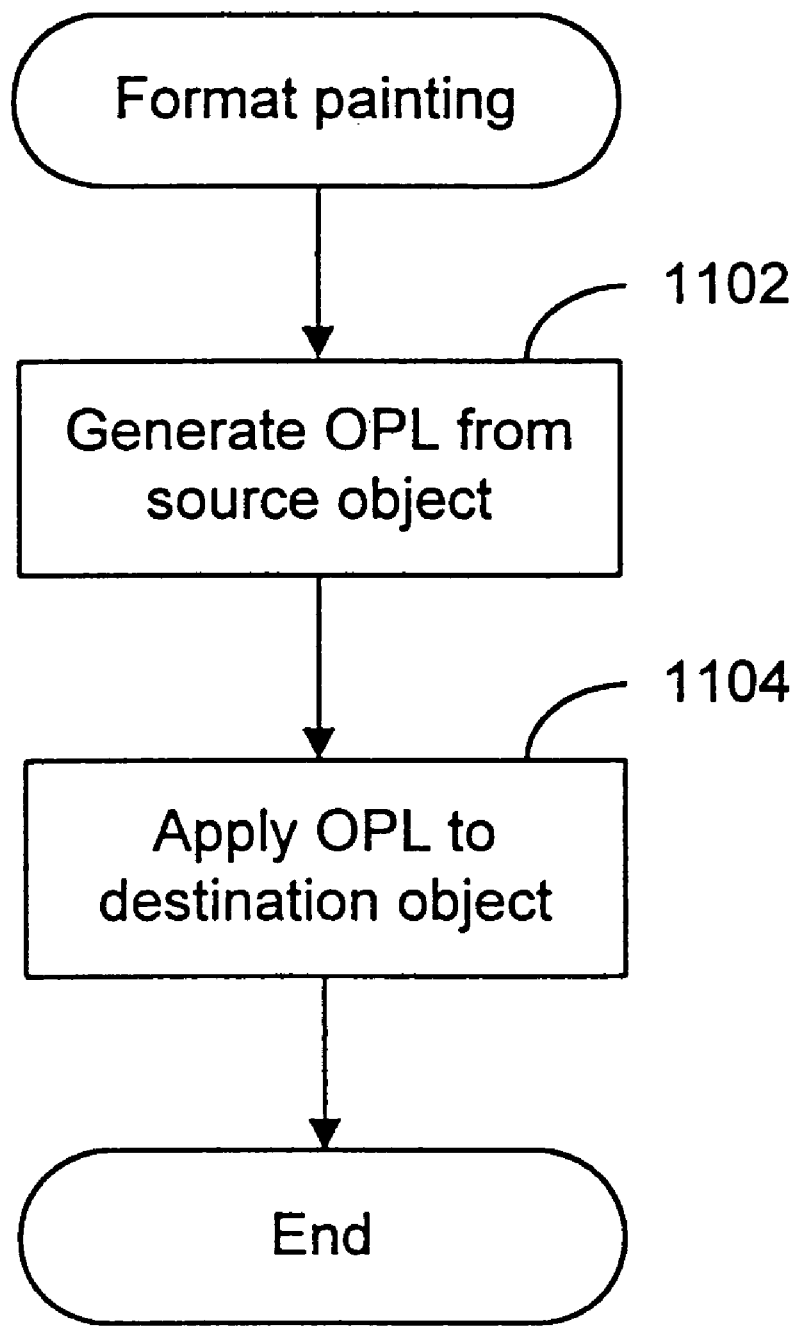
FIG. 11 depicts a flow chart of the steps performed by the format painting application.

FIG. 11 depicts a flowchart of the steps performed by a format painting application. The format painting application provides for the property settings (or format) of a particular object (source object) to be extracted from the source object and applied to another object (destination object). For example, all of the property settings for object 100 in FIG. 1B can be obtained and applied to an object of a different type, such as object 110 in FIG. 1C. This functionality will have the effect of changing all of the properties in object 110 to the settings of the object 100 if the properties are common among the two objects. In other words, if a property is specified in the property list obtained from object 100 which object 110 does not have, this property is ignored. The first step performed by the format painting application is to generate an OPL from the source object (step 1102). In this step, an OPL is generated in Ninch mode so that a property that the source object does not have is not reset on the destination object. That is, if a standard mode OPL were used for the source object and a value were unspecified because the property was unknown, it would be set to its standard value in the destination object even though this action was unintended. Next, the format painting application invokes the apply OPL function and applies the OPL returned from step 1102 to the destination object (step 1104). In this step, the Ninch mode OPL returned from step 1102 is applied to the destination object and the destination object will henceforth adopt the property values of the source object. Again, additional or different properties that the destination object has that the source object does not are unaffected by the format painting application.

Figure 12:
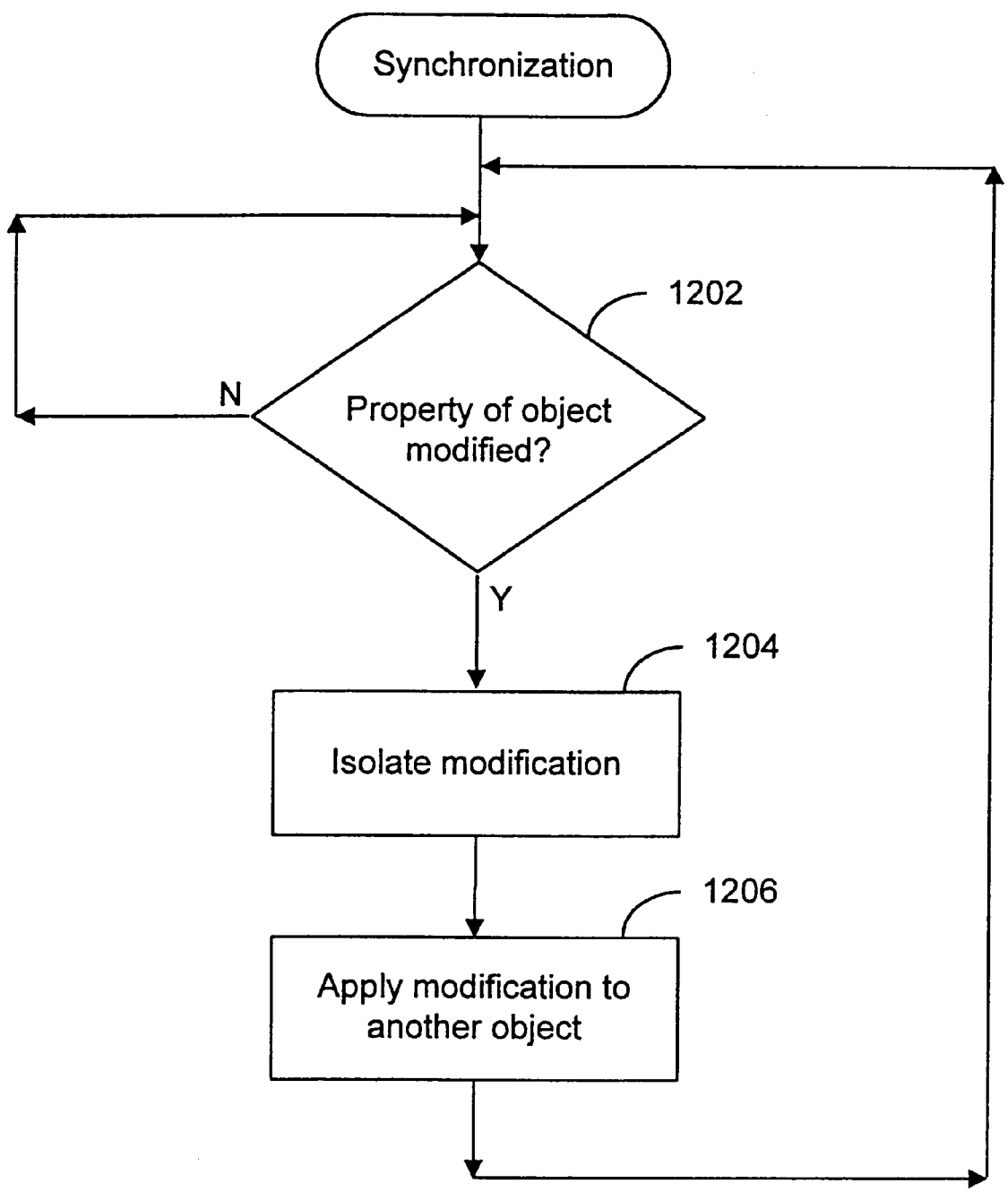
FIG. 12 depicts a flow chart of the steps performed by the synchronization application.

FIG. 12 depicts a flowchart of the steps performed by a synchronization application. The synchronization application synchronizes the properties of one object (first object) with the properties of another object (second object). As such, when the properties of the first object are modified, the synchronization application automatically makes the same modifications to the corresponding properties (i.e., properties having the same property ids) of the second object. The first step performed by the synchronization application is to determine if a property of the first object has been modified (step 1202). This step can be performed by polling the first object at predetermined intervals. When polling the object, the property list of the object is obtained using the generate OPL function and the property list is compared to its most recent OPL, the most recent OPL being retained after each invocation of step 1202. If it is determined that a property has been modified, the synchronization application isolates the modification that was made to the first object by invoking the subtract OPLs function and passing both the OPL of the first object as modified and the most recent OPL of the first object (step 1204). After isolating the modification, the synchronization application applies the modification to the second object (step 1206). The OPL is applied to the second object by utilizing the apply OPL function, after which the synchronization between the properties of the first object with the properties of the second object is achieved.

Figure 13:
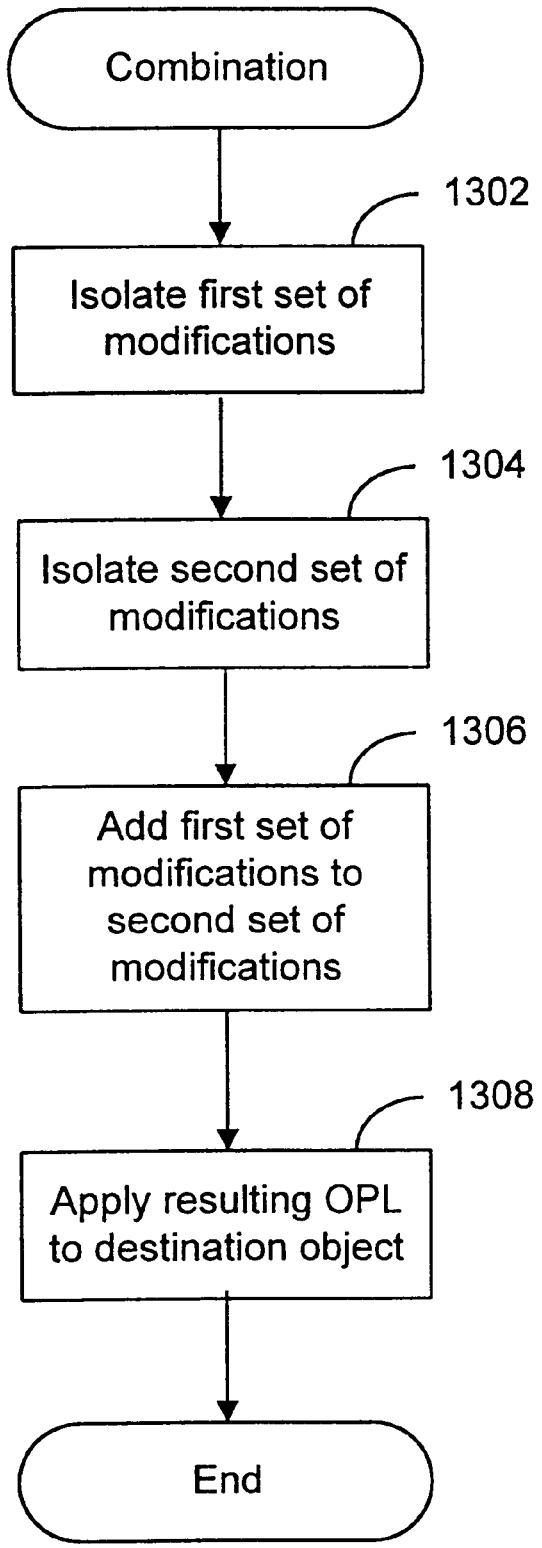
FIG. 13 depicts a flow chart of the steps performed by the combination application.

FIG. 13 depicts a flow chart of the steps performed by a combination application. The combination application provides the user with the ability to combine modifications that were made to two objects (source objects). After combining the modifications, the combined modifications can then be applied to a destination object. This functionality allows a user to pick and choose object formats that they like, combine them, and apply these formats easily to a destination object. The first step performed by the combination application is to isolate the first set of modifications (step 1302). In this step, the modifications made to the first source object are isolated by subtracting the OPL of the source object as modified from the OPL of the source object in its original form. This step is performed by invoking the subtract OPLs function. Next, the combination application isolates the modifications made to the second source object (step 1304). The processing of this step is similar to that as described relative to step 1302. After isolating both the modifications to the first source object and the modifications to the second source object, the combination application adds the modifications together (step 1306). This step is performed by invoking the add OPLs function and designating one of the source objects as the overriding source object. After adding the OPLs together, the combination application applies the resulting OPL to the destination object as specified by a user or program (step 1308). After performing this step, the modifications made to the two source objects have been easily isolated, combined and applied to the destination object.

While the present invention has been described with reference to a preferred embodiment thereof, those skilled in the art will know of various changes in form that may be made without departing from the spirit and scope of the claimed invention as defined in the appended claims.

I claim:

1. A computer-readable medium whose contents cause a computer system having a memory containing an object with properties and a computer program for accessing the properties of the object to perform processing, by performing the steps of:

storing a property list containing the properties in a contiguous block of the memory by the object, wherein at least one of the properties is a nested property list; and generating a descriptor of the property list by the computer program to facilitate access to the plurality of properties.

2. A method for generating an output property list describing properties of an object, comprising:
receiving a request to generate the output property list;
accessing the properties of the object, the properties having values, one of the values being a standard value;
determining if each property is set to its standard value;
copying each property to the output property list when it is determined to not be set to its standard value; and
returning the output property list.

3. A method for adding overriding properties on an overriding property list to secondary properties on a secondary property list and for generating an output property list in a computer system, the method comprising:
copying the overriding properties to the output property list;
determining nonconflicting properties on the secondary property list, the nonconflicting properties being properties on the secondary property list that are not contained on the output property list; and
copying the nonconflicting properties to the output property list.

4. A method for facilitating access to properties of a first object and for facilitating access to properties of a second object in a computer system, comprising:
generating by the first object a first property list containing the properties of the first object; and
generating by the second object a second property list containing the properties of the second object, wherein the first property list and the second property list are generated in a standard format so that arithmetic operations can be performed on the first property list and the second property list.

5. The method of claim 4, further including the step of subtracting the first property list from the second property list to create a third property list.

6. The method of claim 5, further including the step of applying the third property list to a third object.

7. The method of claim 4, further including the step of adding the first property list to the second property list to create a third property list.

8. The method of claim 7, further including the step of applying the third property list to a third object.

9. The method of claim 4 wherein the computer system has a memory and the first property list is stored in a contiguous block of the memory and the second property list is stored in a contiguous block of the memory.

10. The method of claim 4 wherein the first property list contains a nested property list.

11. The method of claim 4 wherein the properties of the first object have values, one of the values being a standard value, and wherein the step of generating a first property list includes storing each property of the first object having a value that is not equivalent to its standard value.

12. A method in a computer system having an original object with original characteristics, a modified version of the original object with modified characteristics and a destination object having characteristics, the method for modifying the characteristics of the destination object based on the modified characteristics of the modified version of the original object, comprising:
identifying differences between the modified characteristics and the original characteristics by subtracting the original characteristics from the modified characteristics; and applying the identified differences to the characteristics of the destination object so that the destination object reflects the modified characteristics.

13. A method in a computer system for modifying properties, the computer system having a first object with first properties having values and a second object with second properties, comprising:
modifying one of the first properties of the first object from an original value to a modified value, one of the second properties of the second object corresponding to the modified first property of the first object;
determining the modification made to the modified first property of the first object by subtracting a property list containing the first properties from a property list containing the second properties; and
applying the determined modification to the corresponding property of the second object.

14. A method in a computer system for modifying properties, the computer system having a first object with first properties having values and a second object with second properties, comprising:
modifying one of the first properties of the first object from an original value to a modified value, one of the second properties of the second object corresponding to the modified first property of the first object;
determining the modification made to the modified first property of the first object by subtracting a property list containing the first properties from a property list containing the second properties, and creating a property list having a no-input-no-change mode wherein only the modified first property is in the created property list; and
applying the determined modification to the corresponding property of the second object.

15. A method in a computer system for modifying properties, the computer system having a first object with first properties having values and a second object with second properties having values, one of the values being a standard value, comprising:
modifying one of the first properties of the first object from an original value to a modified value and storing the modified first property in a property list, one of the second properties of the second object corresponding to the modified first property of the first object;
determining the modification made to the modified first property of the first object by subtracting a property list containing the first properties from a property list containing the second properties;
identifying noncorresponding second properties of the second object, wherein the noncorresponding second properties do not have a corresponding property on the first property list; and
setting the value of each noncorresponding second property to its standard value.

16. A method in a computer system having an original object with original characteristics, a modified version of the original object with modified characteristics and a destination object having characteristics, the method for modifying the characteristics of the destination object based on the modified characteristics of the modified version of the original object, comprising:
identifying differences between the modified characteristics and the original characteristics by accessing the modified version of the original object and generating a descriptor of the modified characteristics and accessing the original object and generating a descriptor of the original characteristics; and applying the identified differences to the characteristics of the destination object so that the destination object reflects the modified characteristics.

17. A method in a computer system for combining modifications to characteristics of a first object with modifications to characteristics of a second object, and for storing the combined modifications in a list, the method comprising:

identifying the modifications to the characteristics of the first object;

identifying the modifications to the characteristics of the second object;

designating the modifications to the characteristics of the first object as overriding characteristics;

designating the modifications to the characteristics of the second object as secondary characteristics;

storing the overriding characteristics into the list;

determining whether each of the secondary characteristics is conflicting or nonconflicting with the overriding characteristics; and storing the nonconflicting secondary characteristics into the list.

18. A method for synchronizing a first property of a first object having a first property list containing properties with a second property of a second object having a second property list containing properties in a computer system, comprising:

receiving an indication that the first property is to be synchronized with the second property;

receiving a request from a user to modify the first property;

in response to receiving the request,
modifying the first property of the first object; and
polling the first object to determine when the first property has been modified, and
in response to determining that the first property has been modified, subtracting the first property list from the second property list to identify the modification made to the first property, and modifying the second property of the second object so as to facilitate the synchronization of the first property with the second property.

19. A method for synchronizing a first property of a first object having a first property list containing properties with a second property of a second object having a second property list containing properties in a computer system, comprising:

receiving an indication that the first property is to be synchronized with the second property;

receiving a request from a user to modify the first property;

in response to receiving the request,
modifying the first property of the first object; and
polling the first object to determine when the first property has been modified, and
in response to determining that the first property has been modified, subtracting the first property list from the second property list to identify the modification made to the first property, and applying the differences to the second object.

20. A method in a computer system having an unmodified property list and having a modified property list that is a modified version of the unmodified property list, each property list having properties with values, the values being either standard or nonstandard, wherein when a value is equal to a standard value the property is omitted from the property list, the method for reflecting the modifications made to the unmodified property list in an output property list, comprising:

comparing the unmodified property list to the modified property list to identify the modifications made to the modified property list;

determining whether the modifications include setting a first property on the unmodified property list to its standard value by detecting that the first property has been omitted from the modified property list;

when it is determined that the modifications include the setting of the first property to its standard value, adding the standard value of the first property to the output property list;

determining whether the modifications include changing a second property from its standard value to a nonstandard value by detecting that the second property has been added to the modified property list and is not contained in the unmodified property list; and when it is determined that the second property has been changed from its standard value to the nonstandard value, adding the second property to the output property list.

21. The method of claim 20 wherein the properties in the unmodified property list and the modified property list have an associated numerical identifier and wherein the method includes the steps of:

identifying equivalent property pairs such that each equivalent property pair has a property from the unmodified property list and a property from the modified property list that have an equivalent numerical identifier; and copying the property from the modified property list for each equivalent property pair into the output property list.

22. The method of claim 21 wherein the steps are performed by a function, and wherein the method includes the steps of:

for each equivalent property pair,
determining whether the property from the unmodified property list or the property from the modified property list is a nested property list;
when it is determined that the property from the unmodified property list and the property from the modified property list is the nested property list, recursively invoking the function.

23. A method for synchronizing a first property of a first object having a first property list containing properties with a second property of a second object having a second property list containing properties in a computer system, comprising:

receiving an indication that the first property is to be synchronized with the second property;

receiving a request from a user to modify the first property;

in response to receiving the request,
modifying the first property of the first object, and
polling the first object to determine when the first property has been modified;
in response to determining that the first property has been modified, subtracting the first property list from the second property list to identify the differences between the first property list and the second property list;

storing the differences in a difference property list as difference properties having values, wherein the difference properties and the second properties of the second object have identifiers;

determining corresponding properties on the second object, wherein a corresponding property is a property contained in the second object that has an identifier that matches a matching property contained in the difference property list; and setting the value of each corresponding property equivalent to the value of its matching property.

24. A method in a computer system for modifying properties, the computer system having a source object with a first property list and having a destination object with a second property list, the first property list and the second property list having properties, each property having an identifier and a value, comprising:

modifying the value of one of the properties of the source object in response to user input to create a modified first property list containing the property with the modified value;

comparing the first property list to the modified first property list to identify the property whose value was modified;

storing the identified property with its value into a third property list;

identifying a property of the second property list with an identifier that matches the identifier of the property of the third property list; and setting the value of the identified property of the second property list equivalent to the value of the property of the third property list.

25. The method of claim 24 wherein the step of comparing the first property list to the modified first property list to identify the property whose value was modified comprises subtracting the first property list from the modified first property list.

26. A method in a computer system for modifying properties, the computer system having a first object with first properties having values and a second object with second properties, comprising:

modifying one of the first properties of the first object from an original value to a modified value, one of the second properties of the second object corresponding to the modified first property of the first object;

determining the modification made to the modified first property of the first object by comparing the original value to the modified value and generating a property list containing an indicator of the modified first property and the modified value; and applying the determined modification to the corresponding property of the second object.

27. A method in a computer system for isolating modifications made to an original property list containing properties, each property having a standard value and a nonstandard value, comprising:

receiving the original property list and a modified version of the original property list containing modified properties;

copying the modified properties to an output property list;

identifying properties contained in the original property list that are not contained in the modified version of the original property list; and copying the identified properties to the output property list and setting the value of each identified property to its standard value.

28. A method for applying a property list containing properties to an object having properties in a computer system, each property having values and an identifier, one value being a standard value, comprising:

receiving the property list;

determining whether the object has a corresponding property for each property on the received property list, wherein each corresponding property has a matching property with a matching identifier on the property list;

setting the value of each corresponding property equivalent to the value of its matching property on the property list;

identifying noncorresponding properties of the object, wherein a noncorresponding property is a property contained in the object that does not have a matching property on the property list; and setting the value of each noncorresponding property equivalent to its standard value.

29. A method for transferring a format of a source object to a destination object in a computer system, the source object and the destination object having properties, the method comprising:

requesting the source object to generate a property list of a standard format, wherein the properties of the source object are stored internally in a nonstandard format;

copying the properties of the source object into the property list of the standard format;

returning the standard format property list;

requesting the destination object to apply the standard format property list to the properties of the destination object; and applying the standard format property list to the properties of the destination object so that the destination object reflects the properties of the source object, wherein the destination object stores the properties in the standard format property list into a nonstandard format.

30. The method of claim 29 wherein the nonstandard format of the source object and the nonstandard format of the destination object are different.

31. The method of claim 29 wherein the step of applying the standard format property list includes:

for each property on the standard format property list,
  determining if the destination object has a corresponding property; and
  copying the property into the destination object when the destination object has the corresponding property.

32. The method of claim 29 wherein the properties have values, one of the values being a standard value, wherein the method includes:

identifying noncorresponding properties of the destination object, wherein a noncorresponding property is a property contained in the destination object that is not contained in the standard format property list;

setting the value of each noncorresponding property to its standard value.

33. A method in a computer system having an original object with original characteristics, a modified version of the original object with modified characteristics and a destination object having characteristics, the method for modifying the characteristics of the destination object based on the modified characteristics of the modified version of the original object, comprising:

identifying differences between the modified characteristics and the original characteristics by accessing the modified version of the original object and generating a descriptor of the modified characteristics and accessing the original object and generating a descriptor of the original characteristics; and applying the identified differences to the characteristics of the destination object so that the destination object reflects the modified characteristics.

34. A method in a computer system for combining modifications to characteristics of a first object with modifications to characteristics of a second object and for having a destination object reflect the combined modifications, the method comprising:

identifying the modifications to the characteristics of the first object;

identifying the modifications to the characteristics of the second object;

adding the modifications to the characteristics of the first object with the modifications to the characteristics of the second object to create a list of combined modifications by designating the modifications to the characteristics of the first object as overriding characteristics, designating the modifications to the characteristics of the second object as secondary characteristics, storing the overriding characteristics into said list, determining whether each of the secondary characteristics is conflicting or non-conflicting with the overriding characteristics, storing the non-conflicting secondary characteristics into said list;

applying the combined modifications in said list to the destination object such that the destination object reflects the modified characteristics of the first object and the modified characteristics of the second object.

35. A method for synchronizing a first property of a first object with a second property of a second object in a computer system, comprising:

receiving an indication that the first property is to be synchronized with the second property;

receiving a request from a user to modify the first property;

in response to receiving the request,
modifying the first property of the first object; and
polling the first object to determine when the first property has been modified, and in response to determining that the first property has been modified, identifying the modification made to the first property and modifying the second property of the second object so as to facilitate the synchronization of the first property with the second property.

36. A computer system comprising:

a memory containing:

a first object with first properties;

a second object with second properties;

a first function for generating a first property list reflecting the first properties contained in the first object;

a second function for receiving a modified version of the first properties, for receiving the first properties, and for subtracting the first properties from the modified version of the first properties to isolate the modifications made to the first properties;

a third function for adding the first properties of the first object with the second properties of the second object;

a fourth function for receiving an input property list containing input properties and for applying the input properties to the first object such that the first object reflects the input properties;

a computer program for invoking the first function, the second function, the third function, and the fourth function; and a processor for running the computer program.

37. The computer system of claim 36 wherein the first function and fourth function are application dependent.

38. The computer system of claim 36 wherein the second function and the third function are application independent.

* * * * *